United States Patent [19]

Giorgetti

[11] Patent Number: 4,726,451
[45] Date of Patent: Feb. 23, 1988

[54] DISK BRAKE ASSEMBLY WITH FLOATING CALIPER

[75] Inventor: Alberto Giorgetti, Paladina, Italy
[73] Assignee: Brembo, S.p.A., Bergamo, Italy
[21] Appl. No.: 684,934
[22] Filed: Dec. 21, 1984
[51] Int. Cl.[4] .................... F16D 65/09; F16D 65/14
[52] U.S. Cl. ............................ 188/73.34; 188/73.1; 188/73.45
[58] Field of Search ............. 188/73.34, 73.42, 73.44, 188/73.43, 73.31, 72.1, 72.4, 250 F, 250 R, 71.1, 369, 370, 250 B, 73.1, 206 R, 73.41

[56] References Cited

U.S. PATENT DOCUMENTS

| | | | |
|---|---|---|---|
| 3,507,365 | 4/1970 | Falk | 188/72.1 |
| 3,980,160 | 9/1976 | Hoffmann et al. | 188/73.38 |
| 4,030,577 | 6/1977 | Ogawa et al. | 188/72.4 X |
| 4,189,032 | 2/1980 | Farr | 188/73.44 |
| 4,331,221 | 5/1982 | Evans et al. | 188/73.44 |
| 4,360,079 | 11/1982 | Belakt | 188/73.34 |
| 4,410,069 | 10/1983 | Schreiner et al. | 188/73.44 X |
| 4,476,962 | 10/1984 | Bofill | 188/71.1 |

FOREIGN PATENT DOCUMENTS

| | | | |
|---|---|---|---|
| 1459110 | 11/1966 | Italy | 188/73.34 |
| 0155935 | 12/1980 | Japan | 188/73.1 |
| 0167926 | 12/1981 | Japan | 188/73.1 |
| 1161355 | 8/1969 | United Kingdom | 188/73.31 |

Primary Examiner—Andres Kashnikow
Assistant Examiner—Robert J. Oberleitner
Attorney, Agent, or Firm—Robbins & Laramie

[57] ABSTRACT

In a disc brake, a caliper body straddles the disc and carries disc engaging brake pads therein. The caliper body is rotatably mounted to the brake support by means of a guide including a pin on the downstream side of the pads. The caliper body is releasably secured in the brake support by means of a movable stop upstream of the pads. Threaded retainer pins engage portions of the pads to retain them within the caliper body and at the same time draw opposed portions of the caliper body together with a predetermined force.

8 Claims, 5 Drawing Figures

DISK BRAKE ASSEMBLY WITH FLOATING CALIPER

The present invention relates to a disc brake asesmbly of the type including a brake support, a caliper body positioned so as to straddle a disc and provided with pads on opposite sides of the disc, and guide means between the caliper body and the brake support, extending in the direction of the axis of the disc.

In disc brakes of this type, the caliper body may be displaced or "float" relative to the support in the direction of the disc axis, in such a way as to be positioned always and in any event on this disc when braking, regardless of the position that the support and the disc have mutually assumed upon assembly due to machining tolerances, and likewise regardless of the wear on the pads and of the dimensional variations caused by thermal expansion of the various components of the said brake.

In order to permit the caliper body to "float" and to be positioned in accordance with the position of the disc, it will be supposed that guide means are interposed between the caliper body and the brake support. According to a solution known in the prior art and widely used in disc brake assemblies, the support is equipped with two generally cylindrical parallel and spaced apart guides, along which the caliper body slides like a drawer, the caliper body being in turn equipped with bushes coupled with these guides.

This solution, although advantageous in various aspects, nevertheless presents certain disadvantages which limit the efficiency thereof.

In particular, it is found that the caliper body is prone to jam in the initial phase of braking, whereas it should move freely to position itself on the disc.

The object of the present invention is to provide a disc brake assembly having structural and functional characteristics such as to overcome the aforementioned disadvantages of the prior art.

This object is achieved by a disc assembly of the type specified, which is characterised in that the said guide means include a pin on which the caliper body is rotatably mounted, this pin being mounted upon the brake support downstream of the pads, and in that stop means for the caliper body are mounted on the brake support upstream of the pads so as to prevent the caliper body from pivoting.

Other characteristics and advantages of the disc brake assembly according to the present invention will become apparent from the description that follows, referring to a preferred embodiment described by way of non-limiting example, with reference to the appended drawings, in which.

Figure 1:
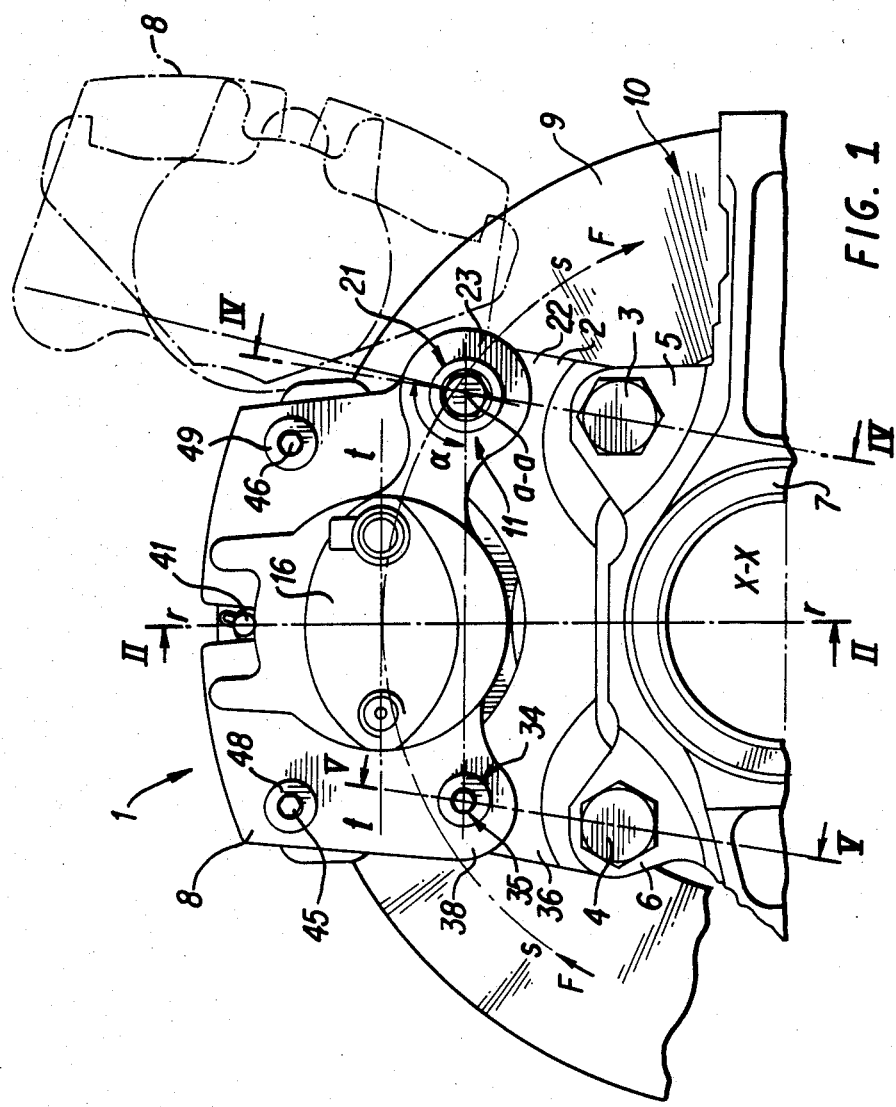
FIG. 1 represents an elevational view of a disc brake assembly according to the invention.
Figure 4:
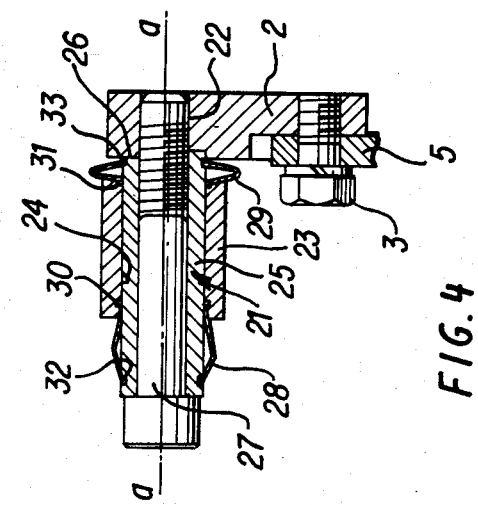
FIG. 4 represents a sectioned view of a detail of the disc brake assembly of FIG. 1, taken along the line IV—IV.
Figure 2:
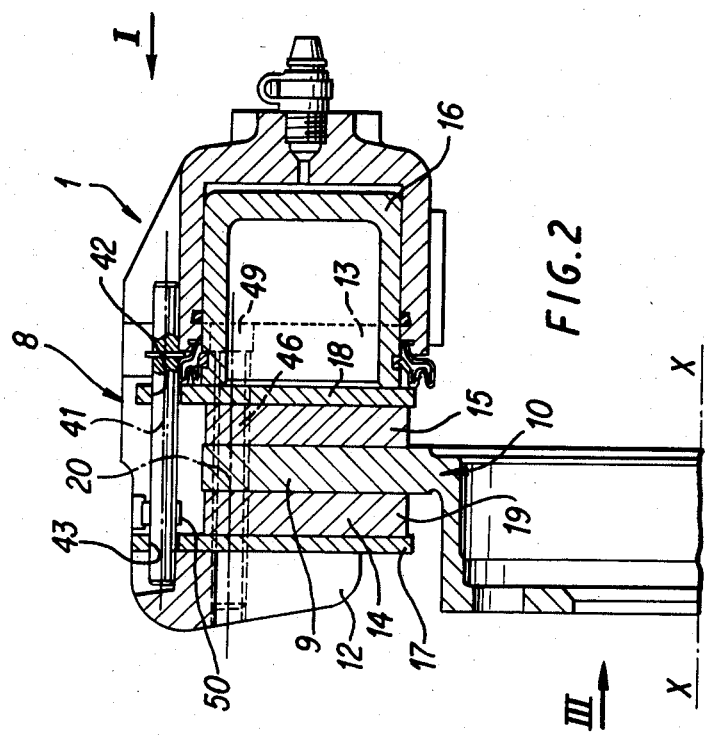
FIG. 2 represents a partially sectioned view of the disc brake assembly of FIG. 1, taken along the line II—II.
Figure 3:
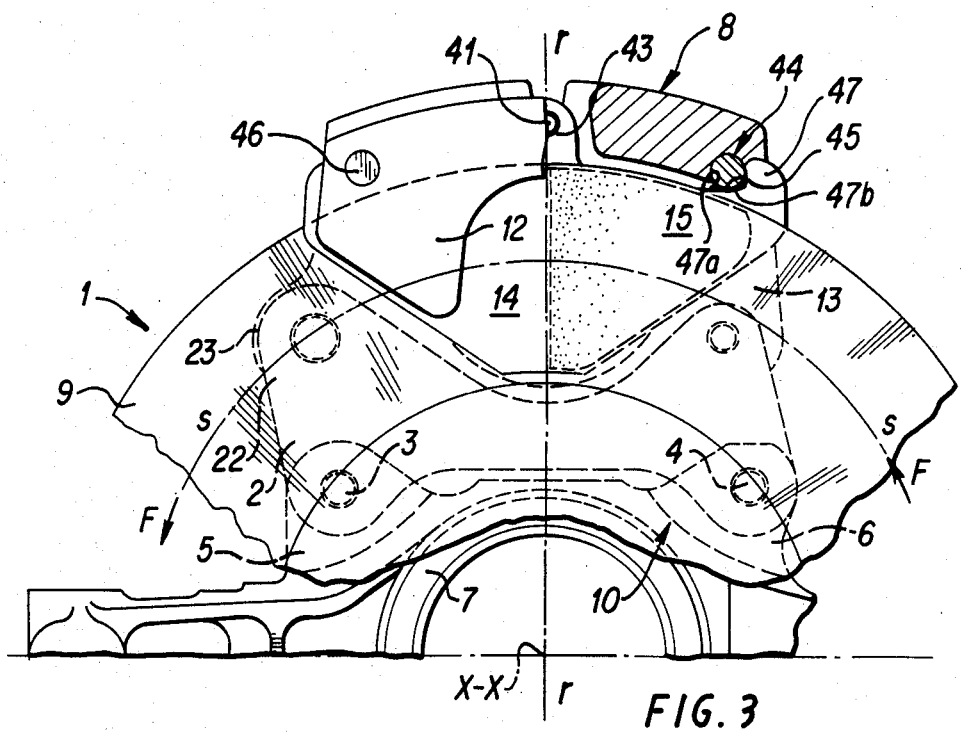
FIG. 3 represents a partially sectioned view of the disc brake assembly, in the direction of the arrow III in FIG. 2.
Figure 5:
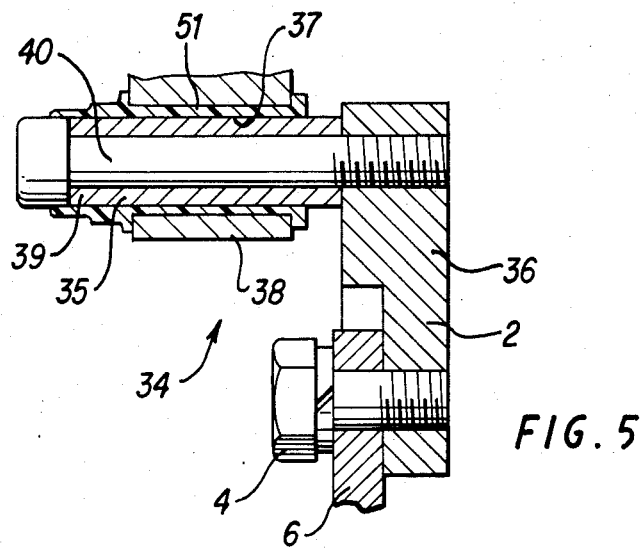
FIG. 5 represents a sectioned view of another detail of the disc brake assembly of FIG. 1, taken along the line V—V.

With reference to the appended drawings, a disc brake assembly according to the invention, generally indicated by the numeral 1, is particularly but not exclusively intended for the braking of a front driving wheel of a motor vehicle.

The disc brake assembly 1 comprises a brake support 2, preferably cast in light alloy, which is rigidly fixed by means of screws 3 and 4 to small lugs 5 and 6 projecting from the periphery of a hub 7 of a motor vehicle wheel, not shown and of entirely conventional type.

The assembly 1 also includes a caliper body 8, preferably cast in light alloy, placed so as to straddle a peripheral portion 9 of a brake disc 10 the axis of which is indicated X—X; this peripheral portion 9 constitutes the annular braking band of the disc 10; the disc 10 is rigidly fixed, in a conventional manner, through a portion thereof, not shown in the drawings, to the hub 7.

Guide means, generally indicated 11, extending in a direction parallel to that of the axis X—X of the disc 10 are provided between the brake support 2 and the caliper body 8 so as to allow free sliding of the caliper body 8 relative to the brake support 2 in the direction X—X.

The caliper body 8, which extends for a predetermined length in a tangential direction relative to the disc, this direction being indicated t—t in the drawings, is formed in one piece with two shoes 12 and 13 positioned on opposite sides of the portion 9 of the brake disc 10; the caliper body 8 is fitted, at the positions of the shoes 12 and 13 and in a manner which will be described in what follows, with respective brake pads 14 and 15 facing the portion 9 on opposite sides thereof, these pads also extending for a predetermined length in the direction t—t.

As the position of the shoe 13 the caliper body 8 is equipped in a conventional manner with a small hydraulic cylinder, generally indicated 16, for urging the pad 15 against a face of the peripheral portion 9 of the disc 10 and urging the pad 14, by reaction, against the opposite face of the said portion 9.

In particular, each pad 14 (15) is formed by a plate 17 (18) of steel, preferably produced by blanking, to which a lining 19 (20) of friction material is attached.

The braking band 9, the pads 14 and 15 and consequently the shoes 12 and 13 of the caliper body 8 have a predetermined extent in a direction r—r which is radial relative to the disc 10 and perpendicular to x—x and to t—t, preferably a fraction, for example, one-third, of the extent of the pad in the direction t—t.

The braking band 9 passes through the disc brake assembly 1 following an arcuate path indicated S—S, touching the line t—t in a direction (under normal running conditions of the motor vehicle) indicated by the arrow F; in relation to this direction of movement positions in the disc brake assembly are indicated as upstream and downstream.

Every reference to positions "upstream" and "downstream" in what follows of the description and in the claims should be understood as specified above in relation to the direction of movement of the braking band in the braking system.

In the disc brake assembly 1 according to he invention, the guide means 11 between the caliper body 8 and the brake support 2 are advantageously positioned downstream of the pads 14 and 15 and comprise a cylindrical pin 21, having an axis a—a extending parallel to the axis x—x, mounted on a small lug 22 provided on the brake support 2 in a position downstream of the pads 14 and 15.

The caliper body 8 is rotatably mounted on the pin 21.

For this purpose the caliper body 8 is fitted downstream of the pads 14 and 15, with an apertured boss 23 formed with a cylindrical bore 24 slidable with limited play on the pin 21.

More particularly, the pin 21 is constituted by a cylindrical sleeve 25 preferably of steel, externally calibrated and having one end engaged in a countersunk cavity 26 formed in the small lug 22, this sleeve 25 being firmly held in the cavity 26 by a steel bolt 27, coaxially extending therethrough and engaging the small lug 22.

The apertured boss 23 is provided at the ends of the bore 24 with respective sealing elements 28 and 29 of the bellows type for protection against dust.

Each bellows-type sealing element 28 (29) extends between an annular groove 30 (31) formed in the bore 24, and an annular groove 32 (33) formed externally on the sleeve 25 of the pin 21, thereby permitting the desired sliding of the boss 23 relative to the pin 21 in the direction of this pin, according to a desired sliding of the entire caliper body 3 relative to the brake support 2 in the direction X—X.

Advantageously, the dimensioning of the pin is selected so as to provide it with a diameter of predetermined value such as to ensure that it has adequate strength.

For the length of the bore 24 there is chosen instead a predetermined value, for example equal to twice the diameter of the pin, so as to ensure positive guiding without jamming of the apertured boss 23 along this pin.

The disc brake assembly 1 according to the invention also includes stop means, generally indicated 34, for the caliper body 8, these stop means 34 being mounted on the brake support 2 upstream of the pads 14 and 15 so as to prevent the caliper body 8 from pivoting.

In particular, the stop means 34 comprise a rod 35 mounted in lug 36 provided on the brake support 2 in a position upstream of the pads 14 and 15.

The rod 35 extends loosely through a bore 37 in an appendage 39 projecting from the caliper body 8 in a position upstream of the pads 14 and 15.

In particular, between the rod 35 and the bore 37 a "teflon" sleeve 51 is located so as to provide shock protection. Moreover, the rod 35 comprises a cylindrical bush 39 releasably fixed to the lug 36 by means of a screw 40 coaxially extending through the bush and engaging the lug 36.

The rod 35 can easily be removed by unscrewing the screw 40.

The caliper body 8, mounted on the support 2 so as to be rotatable about the pin 21, is prevented from pivoting by engagement of the rod 35 with the walls of the bore 37.

The clearance between the rod 35 and the bore 37 is chosen so as to prevent the caliper body 8 from pivoting within the limits of an angular play of predetermined limited magnitude.

In the disc brake assembly 1 according to the invention, the pads 14 and 15 extend in a direction t—t, and are supported on the caliper body 8 by means of a pin 41, mounted loosely with its axis parallel to x—x on the caliper body 8; the pads 14 and 15 are loosely engaged with the pin 41 by means of respective slotted holes 42 and 43.

Stop means generally indicated 44 are provided so as to prevent displacement of the pads 14 and 15 about the pin 41.

These stop means 44 comprise two small cylindrical pins 45 and 46, extending in a direction parallel to that of the axis x—x and housed in the caliper body 8 at the ends thereof, extending between the shoes 12 and 13 in a position immediately outside the external peripheral edge of the braking band 9.

The ends of the pads 14 and 15 engage these small pins 45 and 46; to this end the pads 14 and 15 have hook-shaped ends, indicated 47, symmetrically arranged in relation to the slotted holes 42 and 43. Each hook 47 embraces the respective small pin 45 (46) in two bearing planes 47a and 47b, one extending in the direction t—t and the other being perpendicular thereto, both these bearing planes 47a and 47b facing the pin 41.

To advantage each small pin 45 (46) constitutes the shank of a respective steel screw 48 (49) which is tightened with predetermined force and straddles the caliper body 8 between the shoes 12 and 13 thereof.

In particular, each screw 48 (49) has its head abutting one shoe and its threaded end engaging in the other. The screws 48 and 49, with a predetermined degree of tightening, serve to stiffen the caliper body 8, thus applying a pre-loading stress to the caliper body contrary to the loading effect on braking exerted by the small cylinder 16.

This permits a drastic reduction in the size of the caliper body, and, therefore, both in the weight and in the cost thereof.

A small spring 50 bears against the caliper body 8 and acts with a constant pressure through the pin 41 on the pads 14 and 15 so as to urge these against the small pins 45 and 46 so as to prevent them from rattling and vibrating when the brake is not applied.

During running when the brakes are applied, the caliper body 8 is positioned on the disc 10 sliding freely along the pin 21.

Simultaneously one of the hook ends 47 of each pad 14 and 15 bears against the small pin 46.

Almost simultaneously, when any angular play between the caliper body and the support for engagement of the walls of the bore 37 with the rod 35 has been taken up, the caliper body 8 is held in check by the pin 21, which reacts to the tangential braking force.

Once this condition has been met, the braking may be continued for as long as necessary.

By virtue of the presence of a single cylindrical pin the sliding movement of the caliper body 8 relative to the support 2 in the direction of the axis of the disc is safely achieved in a manner precluding any jamming.

Any angular displacement of the caliper body 8 is prevented by the engagement of the rod 35 in the bore 37.

The pads are firmly held in the caliper body by the hook portions and, during braking, prove to be subject continuously to a state of traction in a direction t—t, imposed by the counteracting effects of the tangential braking force and the reaction of the hook ends respectively. Once again the pads discharge the tangential braking force onto the caliper body 3 through the hook portions 47, which react upon the screws 48 and 49 with contact between materials of a high specific strength (steel against steel) with the elimination of any localised damage.

Upon removal of the rod 35, the caliper body 8 may rotate freely on the pin 21. In particular, this may effect an angular displacement or an amplitude indicated d in FIG. 1 and equal to about 100°, so as to reach a position, indicated by a dotted line, in which the pads may be easily removed from the caliper body whenever necessary.

The brake assembly according to the invention has proved to function better, both in the first phase of braking, during which the caliper body is centered upon the disc without jamming, and during the braking proper.

A further advantage of the disc brake assembly according to the invention resides in the reduced space that this occupies in a radial direction, that is in the direction r—r, which makes it particularly advantageous in the case of front-wheel drive applications.

In addition to this, the disc brake assembly according to the invention is formed of components obtainable by easy mechanical machining and is also easy to assemble and fit.

This finally permits easy replacement of the worn pads by new pads and, where applicable, of the disc itself.

Obviously may modifications and variants may be introduced to the disc brake assembly described above by a person versed in the art, to satisfy specific contingencies, all of which are, however, contained within the scope of protection of the invention, as defined by the claims which follow.

I claim:

1. A disc brake assembly comprising a brake support, a caliper body positioned to straddle a disc, said caliper body carrying at least a bore containing a cylinder therein, pads on opposite sides of the disc, a support pin mounted in the caliper body for loosely carrying the pads, guide means between the caliper body and the brake support, said guide means extending axially of the disc and including a pivot pin on which the caliper body is rotatably mounted, said pivot pin being mounted upon the brake support downstream of the pads, and stop means for the caliper body mounted upon the brake support upstream of the pads to prevent the caliper body from pivoting and, to retain the pads within the caliper body, at least two retainer pins extending parallel to the support pin on opposite sides thereof, said retainer pins engaged with respective portions formed in each of the pads, said retainer pins having threaded shank portions of respective screws, and being firmly tightened with a predetermined force for drawing together opposite portions of the caliper body.

2. A disc brake assembly according to claim 1, wherein said stop means includes a rod extending loosely through a seat formed in the caliper body.

3. A disc brake assembly according to claim 2 wherein said rod is mounted upon the brake support in a releasable manner.

4. A disc brake assembly comprising a brake support, a caliper body positioned to straddle a disc, said caliper body carrying at least a bore containing a cylinder therein, pads having centrally located slotted apertures and hook portions on opposite sides of the slotted aperture, a support pin mounted in the caliper body loosely engaging the slotted apertures for supporting the pads, guide means located between the caliper body and brake support and extending axially of the disc including a pivot pin on which the caliper body is rotatably mounted, said pivot pin being mounted upon the brake support downstream of the pads, stop means for the caliper body mounted on the brake support upstream of the pads to prevent the caliper body from pivoting and means for retaining the pads within the caliper body including at least two pins extending parallel to the support pin and on opposite sides thereof for engaging the respective hook portions formed in each of the pads, said pins having threaded shank portions forming screws engaging opposed portions of the caliper body with a predetermined force.

5. A disc brake assembly according to claim 4 wherein said stop means includes a rod extending loosely through a seat formed in the caliper body.

6. A disc brake assembly according to claim 5 wherein said rod is mounted upon the brake support in a releasable manner.

7. A disc brake assembly comprising a brake support, a caliper body positioned to straddle a disc, said caliper body carrying at least a bore containing an actuator means, the caliper body rotatably mounted on a pivot pin, apertured pads on opposite sides of the disc, a pin carried by the caliper body engaging the apertures of each of the pads for loosely supporting the pads within the caliper body, and retainer means to retain the pads within the caliper body including at least two threaded pins extending parallel to the support pin and engaging opposite sides of the caliper body, said threaded pins being firmly tightened with a predetermined force for drawing together opposite portions of the caliper body with a predetermined preloading force.

8. A disc brake assembly comprising a brake support, a caliper body positioned to straddle a disc, said caliper body carrying at least a bore containing a cylinder therein, pads on opposite sides of the disc, said hydraulic cylinder for urging at least one of said pads against said disc, a support pin mounted in the caliper body for loosely carrying the pads, guide means between the caliper body and the brake support, said guide means extending axially of the disc and including a pivot pin on which the caliper body is rotatably mounted, said pivot pin being mounted upon the brake support downstream of the pads, and a rod mounted upon the brake support in a releasable manner upstream of the pads and extending loosely through a seat formed in the caliper body to prevent the caliper body from pivoting and, in order to retain the pads within the caliper body against the tangential braking force, at least two retainer pins extending parallel to the support pin on opposite sides thereof, said retainer pins engaged with respective portions formed in each of the pads, said retainer pins having threaded shank portions of respective screws, and being firmly tightened with a predetermined force in order to draw together opposite portions of the caliper body against the force of said cylinder.

* * * * *

UNITED STATES PATENT AND TRADEMARK OFFICE
CERTIFICATE OF CORRECTION

PATENT NO. : 4,726,451

DATED : February 23, 1988

INVENTOR(S) : Alberto Giorgetti

It is certified that error appears in the above-identified patent and that said Letters Patent is hereby corrected as shown below:

On the cover page of the Patent in the left-hand column after

"[22] Filed: December 21, 1984"

insert

--[30]    Foreign Application Priority Data
          December 23, 1983 [IT]  Italy ........... 24024-B/83--

Signed and Sealed this

Second Day of August, 1988

Attest:

DONALD J. QUIGG

*Attesting Officer*    *Commissioner of Patents and Trademarks*